United States Patent Office 3,230,792
Patented Jan. 25, 1966

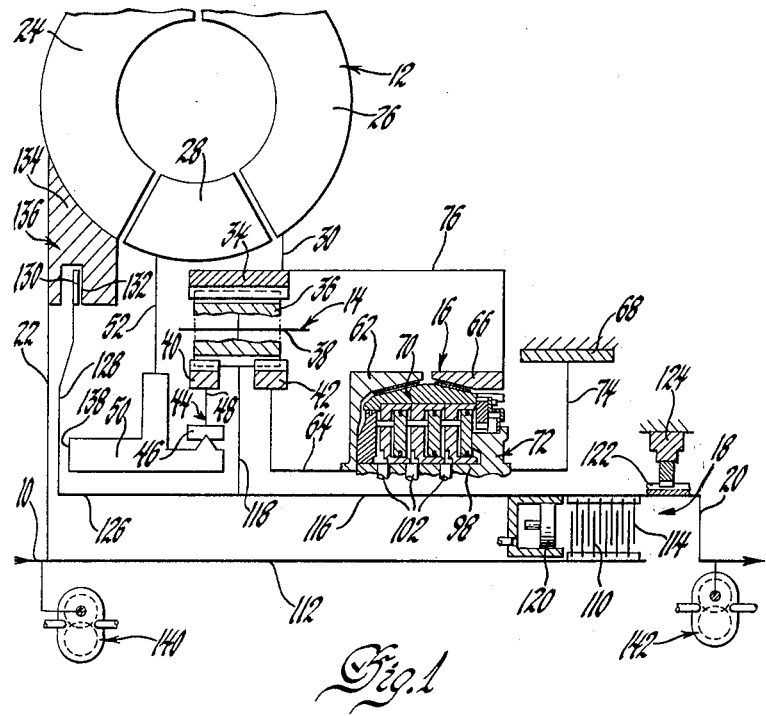

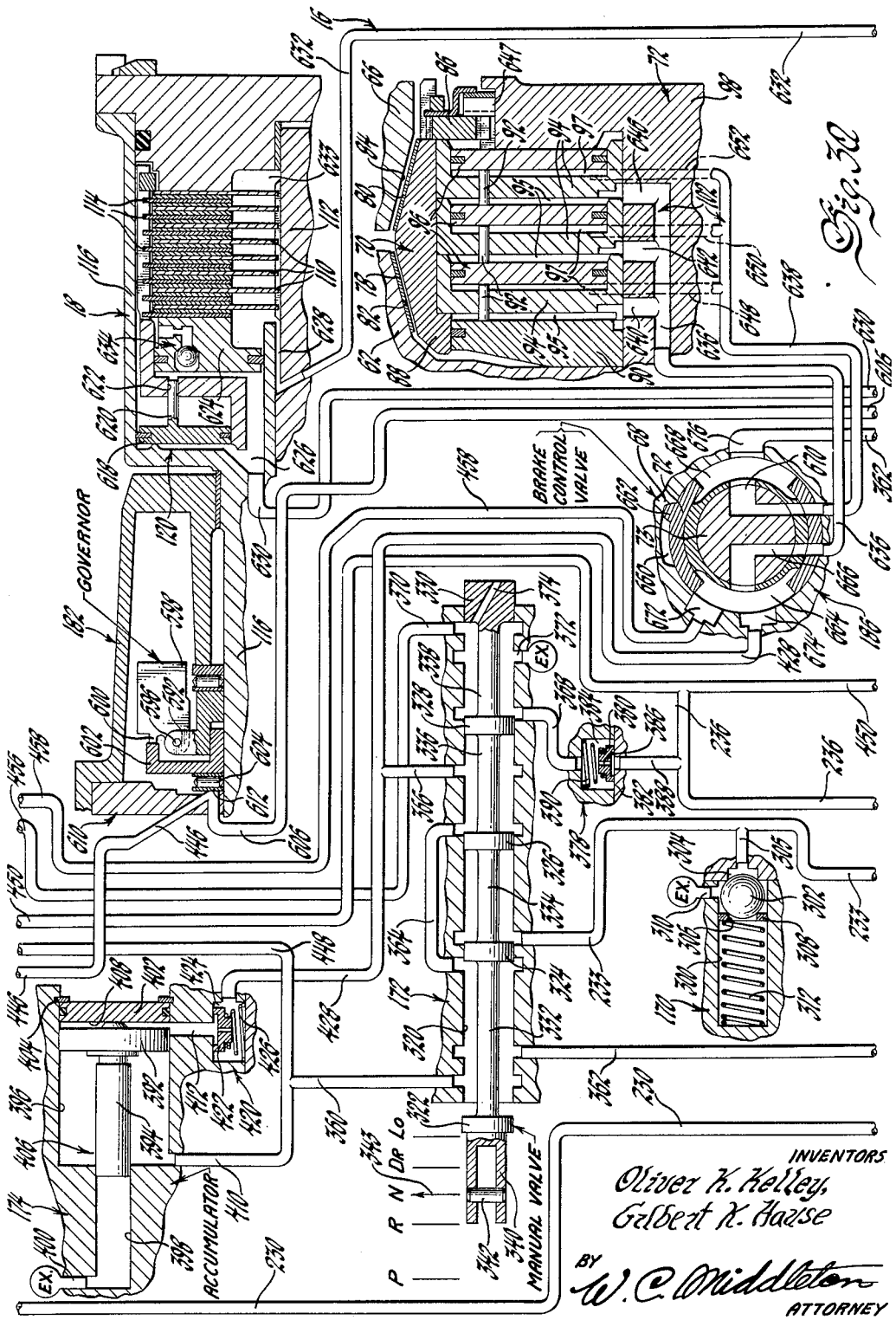

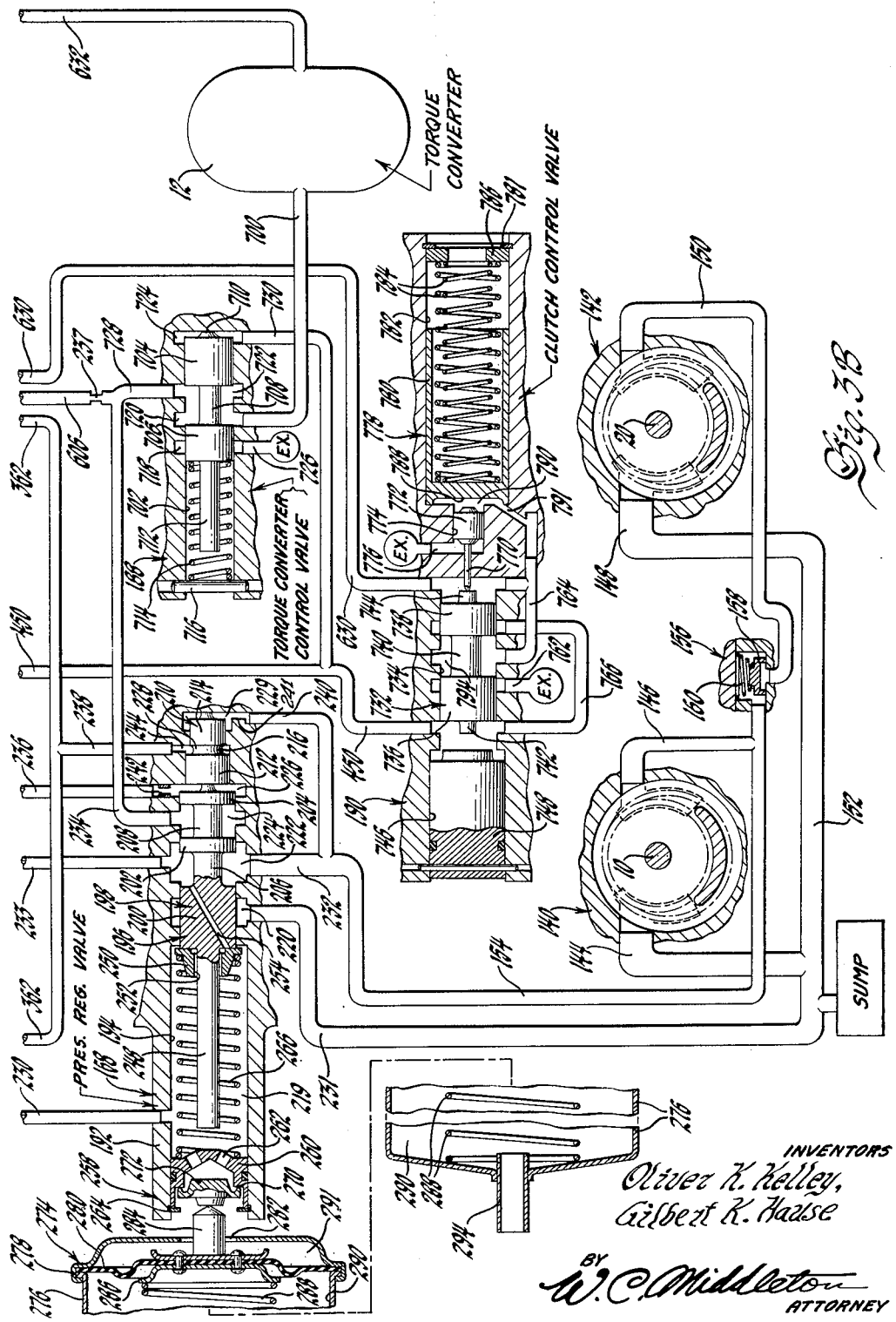

3,230,792
TRANSMISSION CONTROL SYSTEM
Oliver K. Kelley and Gilbert K. Hause, Bloomfield Hills, Mich., assignors to General Motors Corporation, Detroit, Mich., a corporation of Delaware
Filed Oct. 10, 1958, Ser. No. 766,515
10 Claims. (Cl. 74—472)

This invention relates to a hydraulic control system for an automatic transmission.

In automatic transmissions wherein a plurality of forward speed ratios, neutral and reverse ratio are provided by selectively engaging a plurality of hydraulically actuated clutches and brakes, an automatic hydraulic control system may be provided for automatically effecting the engagement or disengagement of the brakes and/or clutches to provide the several speed ratios in accordance with operator selection, driven shaft speed, and other factors.

Therefore, it is an object of this invention to provide a hydraulic control system for an automatic transmission to cause selective engagement of the several clutches and brakes automatically in accordance with driven shaft responsive means modified by operator controlled responsive means for selectively establishing a preselected speed ratio upon predetermined conditions.

An object of the invention is to provide in a planetary change speed transmission, a control responsive to a change in direction of rotation of a member of the planetary change speed transmission to control the engagement of said member in response to the change in direction of rotation of the member.

An object of the invention is to provide in a planetary transmission having a reaction member, control means responsive to the reaction to hold the reaction member.

It is another object of this invention to provide a hydraulic control system with a rotary brake control valve that is movable in opposite directions to control the operation of the brake mechanism in accordance with the direction of the reactive force existing at the time in the gearing of the transmission.

Other features, advantages and objects will become apparent by reference to the detailed description of the invention and to the drawings wherein:

FIGURE 1 is a schematic illustration of a transmission employing the use of the control system embodying this invention, FIGURE 2 is a preferred physical layout of the drawings to be made for showing the complete control system of this invention, FIGURE 3 is a schematic illustration of a part of the control system embodying this invention, with the valve body being cut away and sectioned, FIGURE 3A is a second part of the control system similar to FIGURE 3, and FIGURE 3B is a final part of the control system embodying this invention, FIGURES 3, 3A and 3B together illustrating schematically the entire control system of this invention in cut-away and cross-sectional views.

Referring to the drawings and more particularly to FIGURE 1, there is shown therein a drive or input shaft 10 adapted to drive a conventional torque converter 12 combined with a planetary gear set 14 and brake and clutch mechanisms 16 and 18, respectively, to drive an output shaft 20 in a plurality of forward speed ratios, neutral and reverse.

The gearing and torque converter per se of the transmission form no part of the present invention, but will be described to show the controlling effect of the hydraulic control system of this invention upon the brakes and clutches to provide the respective forward drive ratios, neutral and reverse.

The input or drive shaft 10, which may be driven by any suitable power source, has an extension 22 connected to the rotatable pump 24 (shown only partially) of a conventional torque converter 12 having the usual normally forwardly rotating turbine 26 and a stator-turbine member 28. As is usual in the case of a torque converter of this type, the blades of the pump, turbine and stator members are so designed that at low forward or clockwise rotational speeds of the pump 24 (as viewed from the left side of the transmission), the fluid will be delivered from the same to rotate the turbine clockwise whereupon the fluid leaving the turbine 26 does so in a manner to strike the blades of the stator-turbine 28 to attempt to rotate it in a direction opposite to the direction of rotation of pump 24. At higher rotational speeds of pump 24, the fluid leaves the blades of turbine 26 at a more favorable angle to strike the stator-turbine blades tending to rotate the stator-turbine 28 in a forward or clockwise direction. The stator-turbine 28 is adapted to be held from reverse or counterclockwise direction to provide a reaction member in the torque converter thereby establishing torque conversion, by means to be described hereinafter. At higher rotational pump speeds, the stator-turbine 28 is permitted to rotate freely in a forward direction. Thus, at low rotational pump speeds, the hydraulic torque transmitting device 12 acts as a torque converter, while at high pump speeds, the device acts as a fluid coupling merely transmitting the torque from the drive shaft 10 to the gear set without multiplication of torque.

Connected to the turbine 26 by a drive connection 30 is a ring gear 34 of a planetary gear set 14, the ring gear 34 meshing with a plurality of planet pinions 36 rotatably supported upon a planet carrier 38 and in turn meshing with first and second sun gears 40 and 42 having identical numbers of teeth.

First sun gear 40 is connected to turbine-stator 28 by means of a one-way device 44 having one race 46 connected to the sun gear 40 by a connection 48, with the second race 50 connected to the turbine-stator 28 by a connection 52. The one-way device 46 engages upon reverse rotation of turbine-stator 28 relative to sun gear 40, and disengages upon forward rotation of the turbine-stator relative to the sun gear. With such a connection, the turbine-stator 28 may rotate forward freely even though sun gear 40 may be held, and may also drive sun gear 40 rearwardly by engagement of the one-way device upon driving of the turbine stator in a reverse direction providing sun gear 40 is free to rotate thus. Second sun gear 42 is connected to a cone brake element 62 of a brake mechanism 16 by a connection 64.

The brake mechanism 16 (see FIGURES 1 and 3A) is of the double acting type and comprises cone brake elements 62 and 66 selectively held from rotation by a connection to the transmission casing at 68 through a fluid pressure actuated piston 70 and drive connections 72 and 74. The cone brake element 66 is connected to the ring gear 34 by a connection 76 for a purpose to be described later. The piston 70 (see FIGURE 3A as well as FIGURE 1) has a plurality of friction faces 78 and 80 adapted to cooperate with the cone brake elements 62 and 66, respectively, of the cone brake elements 62 and 66. The piston 70 has an extension 86 at one end slidably splined to the portion 72 of the brake housing connected to the transmission casing at 68, and is slidably mounted at its other end 88 upon another portion 90 of the brake housing. Spaced from the portion 90 by means of a plurality of guide pins 92 secured thereto and extending through suitable bores in the portions 94 of the piston 70 are further piston supporting means 96. The brake housing 98 is provided at its lower portion with suitable fluid pressure conduits 102 for supplying actuating fluid to opposite sides of the depending piston portions 94 for actuation of the piston to engage alternatively and selectively the cone brake elements 62 and 66.

Suitably adapted to connect the drive shaft 10 and driven shaft 20 in a direct drive ratio thereby by-passing the torque converter 12 is a fluid pressure actuated friction clutch mechanism 18 having one set of friction clutch plates 110 splined to an extension 112 of the drive shaft 10, with the other set of friction plates 114 splined to a hollow shaft 116 rigidly connected with an extension 118 of the carrier 38. The engagement of clutch 18 by a fluid pressure actuated piston 120 will be described at a later time in connection with the description of the control system for this transmission.

Fixed to the transmission output shaft 20 for rotation therewith is a geared member 122 adapted to cooperate with a slidable pawl mechanism 124 for selectively braking or releasing the output shaft. The operation of this pawl mechanism to selectively engage or disengage the gear 122 will also be described at a later time.

Formed on an extension 126 of the sleeve shaft 116 is an annular flexible plate-like member 128 having the shape shown in FIGURE 1 and provided at its outer periphery with a friction surface 130 adapted to cooperate with the friction surface 132 provided on an enlarged boss 134 attached to both the extension 22 of the drive shaft and the pump 24. The flexible plate 128 together with the friction surfaces 130 and 132 constitute a vibration dampening mechanism 136 to dampen the oscillations or torsional vibrations of the engine when the direct drive clutch is applied. As will be seen in FIGURE 1, the race 50 of one-way device 44 has a portion 138 adjacent the flexible plate 128, and it is the movement of this portion 138 in either direction that engages or disengages the vibration dampening device. The operation of the device will be described at a later time.

Before proceeding to the detailed description of the control system for this transmission, a general description of the transmission as described will be given.

Neutral condition of the transmission is established by disengaging brake elements 62 and 66 and clutch 18 to permit sun gears 40 and 42 to rotate freely in a counterclockwise direction as viewed from the left side of FIGURE 1. Upon clockwise rotation of the pump 24, turbine 26 and ring gear 34 will rotate clockwise at approximately the same speed as the pump thereby causing turbine-stator 28 to also rotate clockwise, one-way device 46 disengaging at this time. With the stationary output shaft 20 acting as a reaction member, the sun gears 40 and 42 will be rotated counterclockwise freely without transmitting any torque to the output shaft 20. Therefore no drive is transmitted through the transmission and the vehicle remains stationary.

Forward reduction drive is established by engaging cone brake element 62 to hold sun gears 40 and 42 stationary. Upon clockwise rotation of pump 24 and turbine 26, turbo-stator 28 will attempt to rotate counterclockwise, thereby engaging one-way device 46 and holding the turbo-stator 28 stationary. Clockwise rotation of ring gear 34 will rotate carrier 38 and output shaft 20 forwardly or clockwise and at a speed reduced from the speed of input shaft 10.

High speed forward drive is provided by disengaging cone brake element 62 and engaging direct drive clutch 18 to lock the input shaft extension 112 and output shaft 20 together for a 1:1 drive ratio. At this time, the torque converter 12 is filled with fluid under zero pump or line pressure. Since there is no reaction in the gear set, the torque converter will rotate as a fluid mass with the result that pump 24, turbine 26 and stator-turbine 28 will be rotated clockwise at approximately the same speeds to rotate ring gear 34 and sun gears 40 and 42 clockwise at substantially the same speed as carrier 38. This effects a "lock-up" of the gear set.

Reverse speed is obtained by engaging cone brake element 66 to hold ring gear 34 and turbine 26 stationary, while disengaging brake element 62 and direct drive clutch 18. Upon clockwise rotation of pump 24, turbo-stator 28 rotates counterclockwise to engage one-way device 46 to rotate sun gears 40 and 42 counterclockwise. With ring gear 34 acting as a reaction member, carrier 38 is driven at a reduction ratio and in a reverse direction to the direction of rotation of input shaft 10.

Referring now to the control system for controlling the engagement and disengagement of the various cone brakes 62, 66, clutch 18, parking brake pawl 124 and vibration dampening device 130, by placing FIGURES 3, 3A and 3B in the relative positions shown in FIGURE 2, the hydraulic control system may be viewed as a complete unit. The control system includes drive shaft and driven shaft pumps 140 and 142, respectively, both pumps being of the conventional positive displacement gear type adapted to deliver a constant supply of fluid pressure. The drive shaft or engine driven pump 140 is shown in FIGURES 1 and 3B as being secured to the engine shaft 10 for rotation therewith, and having a fluid intake line 144 and fluid output line 146. The driven shaft pump 142 is secured for rotation with the driven shaft 20 and has an intake fluid line 148 and a fluid output line 150. The pumps per se are conventional and form no part of this invention, and therefore a description of the details of the same is believed unnecessary. The fluid intake conduits 144 and 148 are both connected to the transmission sump through a connecting line 152, while the fluid delivery lines 146 and 150 are connected to common supply line 154. Furthermore, line 150 is connected to supply line 154 through a one-way check valve 156, the valve 156 having a member 158 seated against the valve casing by a spring 160 to prevent communication of fluid between lines 154 and 150 when the rear pump 142 is not in operation, while, however, unseating to permit the rear pump to deliver its fluid pressure through the line 150 to the main supply line 154. While the front pump 140 is of a size and capacity sufficient to satisfy the entire fluid pressure demands of the control system by itself under normal operating conditions, the smaller capacity rear pump 142 is provided for supplying the necessary fluid in the case of a push start with the engine stalled, wherein the front pump would be inactive and unable to supply fluid pressure to the system.

Referring now to the valves per se, the system as shown in FIGURES 3, 3A and 3B, includes, reading clockwise from the left-hand portion of FIG. 3B, a fluid pressure regulator valve 168, a pressure reliev valve 170, a vehicle operator-operated or "manual" valve 172, a fluid pressure accumulator 174, a speed ratio determining shift valve 176, an accelerator pedal operated detent valve 178, a downshift control valve 180, governor mechanism 182, a direct drive clutch 18, a brake fluid pressure control valve 186, a brake mechanism 16, a torque converter control valve 188, a direct drive clutch control valve 190, and a torque converter 12.

The valves per se and the torque transmitting devices will be described separately from their joint cooperation in an effort to more clearly set forth how each of the valves is constructed. The combined operation of the valves in the control system will be described later under an overall operation of the transmission.

*Pressure regulator valve 168*

Referring to FIGURE 3B, the valve body 192 is suitably bored at 194 to slidably receive a two-piece reciprocating spool type valve 196, the main pressure regulating piece or part 198 of the valve having a plurality of lands 200, 202 and 204 connected by means of reduced neck portions 206 and 208; with the second piece or part 210 of the valve 196 being a pressure actuated and reducing portion and having a plurality of lands 212 and 214 connected by a reduced neck portion 216. The valve lands divide the bore 194 into chambers 219, 220, 222, 224, 226, 228 and 229 connected with fluid pressure conduits 230, 231, 232, 233, 234, 236, 238 and 240. Land 212 is larger than land 214, with lands 200, 202 and 204 being of an equal size and each larger than land 212 for a purpose to be described hereinafter. Suitably restricting the flow of fluid in conduits 236, 238 and 240 are orifices 242, 244 and 241, respectively. The left end of the valve has a spacer stem 248 traversing chamber 219 and acting as a centering device for a fluid metering boss 250 slidably and loosely mounted thereon. The boss 250 has a restricted fluid channel 252 connected with a restrictive channel 254 diagonally bored in the land 200 for supplying fluid from chamber 222 to chamber 219. Closing the bore 194 at the left end of chamber 219 is a relief-valve mechanism 258 having a slidable sleeve 260 resiliently pressed into engagement with a snap-ring 264 by a compression spring 266 seated between the sleeve and boss 250. The sleeve 260 is provided with fluid communication holes 262 and is formed with an annular shoulder 270 against which an annular knife-edged plug 272 is normally seated to prevent the escape of fluid from the chamber 219 to the transmission sump.

Plug 272 is seated by an engine-vacuum-spring force responsive device 274 comprising a housing 276 having fixed therein at 278 an annular flexible diaphragm 280 dividing the housing into two chambers 290 and 291. Riveted to one side of the diaphragm is a lug 284 projecting through a suitable aperture 282 in the housing to bear against the plug 272, while riveted to the other side is a dish-shaped seat 286 for one end of a spring 288, the other end bearing against the housing 276. A conduit 294 connects the vacuum in the intake manifold system of the vehicle engine with chamber 290 so as to render the diaphragm 280 responsive to the fluctuations and changes in the vacuum. Chamber 291 is filled with air at atmosphere pressure through hole 282. The force of spring 288 is chosen such that when the vacuum in line 294 is at a maximum, the resultant force on plug 284 will be zero.

The pressure regulator valve 168 is provided for regulating the pressure from the vehicle fluid pumps to operate the clutch and brakes in accordance with torque requirements. It also regulates the pressure acting on the "shift" valve 176 to control the change in the transmission from reduction drive to direct drive or vice versa in accordance with torque demands as evidenced by the increase or decrease in the vacuum in the engine intake manifold system. Therefore, the general operation of the pressure regulator is as follows.

With the engine running and assuming that the accelerator pedal (not shown) is in its closed position with the vacuum in the intake manifold system and line 294 at a maximum, the resultant force exerted on plug 284 to hold plug 272 on its seat 270 will be substantially zero. Therefore, any fluid pressure fed to chamber 219 will unseat plug 272 and drain the fluid to the sump through the open end of the chamber. Accordingly, no pressure will exist in line 230. Upon filling of the chambers 222 and 229 with fluid under pressure from the transmission pumps through lines 232 and 240, the fluid pressure will act against the land 214 of valve portion 210 sufficiently to move the valve to the left against the force of spring 266 to connect chambers 222 and 224. Line 234 is then filled with fluid to permit a build-up of pressure in chambers 224 and 222. Simultaneously, the fluid in chamber 222 is orificed through line 254 and the boss 250 to unseat the plug 272 and maintain chamber 219 void of fluid under pressure. The size of channel 254 is small enough to prevent a pressure drop in chamber 222.

The high pressure acting on land 214 moves the valve further to the left until drain chamber 220 is connected to chamber 222. Enough fluid is then returned to the sump through line 231 to lower the pressure acting on land 214 to a value below that of the force exerted by spring 266 such that the valve is moved to the right and the exhaust chamber 220 is closed. The valve will then regulate between positions alternately opening and closing the line 231 to the sump, thereby maintaining the pressure in chambers 222 and 224 at a predetermined minimum, for example, say 60 p.s.i., regardless of the increase in output of the pump.

If the engine vacuum in line 294 is decreased to increase the spring force on plug 272, the fluid in chamber 219 and line 230 will have a corresponding pressure and exert the same against the boss 250 to move the valve 198 to the right. A higher pressure is then required to balance the force of the spring and the increase in pressure in chamber 219 to crack open the sump chamber 220, this higher pressure being reflected in lines 233 and 234. The change in regulated pressure in lines 233 and 234 will therefore at this time depend upon the increase or decrease in the vacuum in line 294, ranging from 60–252 p.s.i., for example, assuming the proper loadings of springs 288 and 266 are chosen to produce this pressure range. The pressure in line 230 may vary from 0–80 p.s.i., for example. Aside from the effect of the vacuum in line 294, the change in pressure in lines 233 and 234 will be dependent upon whether or not fluid is introduced to fill chambers 226 and 228. Since land 212 is larger than land 214, fluid under pressure filling chamber 228 will cause a force to be exerted on the differential area of the two lands to aid in moving the valve to open sump chamber 220. This resulting in a lower regulated pressure in lines 233 and 234. Conversely, with chambers 226, 228 and 230 filled with fluid, draining of any one of the chambers will increase the regulated pressure in lines 233 and 234.

The pressure regulator valve therefore acts to regulate the line pressure of the system with the regulator valve having its movement controlled by the amount of vacuum in the system. The conduit 230 leading to the "shift valve" 176 is therefore filled with a fluid sensitive to changes in the torque conditions.

Pressure relief valve 170

Referring to FIGURE 3A, the valve body is bored at 300 for slidably receiving a ball check or pressure relief valve 170 having a ball 302 alternately seated between the valve body at 304 and an aperture 306 of a slidable plate 308 to either close a fluid pressure line 305 or connect the fluid pressure in line 305 to the transmission oil sump through an exhaust conduit 310. Conduit 305 is connected to the fluid pressure supply line 233. The plate 308 is normally biased into engagement with the ball 302 by a spring 312 seated thereagainst at one end with the other end against the end of the bore 300. The force of spring 312 is chosen to limit to a predetermined maximum the pressure of the fluid in conduits 305 and 233. Upon exceeding the limit, ball 302 will be forced leftwardly to open the connection between conduits 305 and 310 until such time as the pressure in conduit 305 has been reduced to a point permitting spring 312 to again seat ball 302 against the valve body at 304. The pressure relief valve 170 therefore prevents injury to the transmission by preventing an excessive build-up of fluid pressure in the system.

Manual valve 172

The "manual valve" 172 shown in FIGURE 3A comprises a reciprocating spool-type valve slidably received within a bore 320 of the valve body and consists of a plurality of lands 322, 324, 326, 328 and 330 connected by neck portions of reduced diameter 332, 334, 336 and 338. The left end of the manual valve has a yoke 340 for connection with a conventional manually operated shift lever (not shown) adapted to be selectively moved by the operator of the vehicle. As shown on the drawings, the manual valve may be moved alternatively to several positions for controlling the automatic operation of the transmission, these positions being Park (P), Reverse (R), Neutral (N), Drive (Dr) and Low (Lo), with the pin 342 and arrow 343 indicating the immediate condition of the transmission selected. The valve body is also suitably bored for connection with suitable fluid conduits 360, 362, 364, main line feed 233, lines 366, 368, 370 and exhaust line 372. A restrictive orifice 374 is diagonally bored in land 330 for better drainage purposes when the manual valve is conditioned for Park, for example. The provision of a manual valve affords a selective control by the vehicle operator by controlling the supply of main line fluid pressure through line 233 to the respective mechanisms to be operated, as will be described later. Therefore, it will be seen that movement of the valve to its several positions will determine which of the several supply lines will be connected to line pressure and which to the transmission sump through exhaust line 372.

Shown also in FIGURE 3A is a fluid metering or timing mechanism 378 having a valve 380 seated against one wall 382 of a bore 384 in the valve body, with an orifice 386 for intermittently restrictively connecting conduits 368 and 388. The valve 380 is held against its seat by a spring 390 and a higher pressure in line 368, but may be unseated to provide unrestricted flow by a higher pressure in line 388.

Fluid pressure accumulator 174

Also shown in FIGURE 3A is the fluid pressure accumulator 174 comprising a piston 392 and stem 394 slidable within valve body bores 396 and 398, respectively, with the bore 398 connected at its end to a fluid conduit 400 leading to the transmission sump. The bore 396 is closed at its one end by an annular plug 402 positioned against a snap ring 404. The piston 392 therefore divides the bore 396 into two fluid chambers 406 and 408 connecting with suitable fluid lines 410 and 412, respectively. Fluid line 412 leads to a metering valve 420 similar to metering valve 378 and comprising an orificed valve 422 seated against one wall of a bore 424 by a spring 426 for controlling the rate of flow of fluid to and from one side of the accumulator by controlling the rate of fluid flow between conduit 412 and a conduit 428.

The fluid pressure accumulator 174 is provided primarily for the following reason. With the vehicle in "high gear," the transmission is in direct drive with the sun gears 40 and 42 rotating forwardly or clockwise at approximately engine speed. When a forced or full throttle "downshift" or change to a lower gear ratio is made, the torque converter immediately becomes operative to drive the ring gear 34 forwardly, with the output shaft acting temporarily as a reaction member by resisting speed change to tend to hold the carrier 38 stationary relative to the motion of ring gear 34. Therefore, ring gear 34 will attempt to rotate sun gears 40 and 42 rearwardly. To do this, the sun gears must reverse their forward rotation. To prevent reverse drive of the sun gears to thereby establish the sun gears as reaction members, however, brake 62 is applied. It will be clear that in reduction drive the engine rotates faster than in direct drive. Therefore, to permit the engine to build-up to the proper speed for initial operation in reduction drive without undue strain and possible injury thereto, it is essential that the application of the cone brake 62 be delayed until the exact moment when the turbine reaches the proper speed, which speed corresponds to the exact moment when the sun gears would reverse their direction of rotation. For example, if the transmission is in direct drive ratio, the turbine will be operating at say 1000 r.p.m. Upon a downshift, the turbine will speed up to 1600 r.p.m., at which point the sun gears will stop their forward or clockwise rotation. At 1601 r.p.m. the sun gears 40 and 42 will begin to rotate counterclockwise. It is at this point, 1600 r.p.m., that it is desired to engage the cone brake element 62. The fluid pressure accumulator or wash-out accumulator is provided for accomplishing this purpose, i.e., of delaying the engagement of the brake, as will be described later.

Speed and gear ratio control valve 176

The speed and/or gear ratio control valve 176 or "shift valve," as it is commonly termed, is shown in FIGURE 3 comprising a spool-type reciprocating valve slidably received within a bore 430 of the valve body. The valve is provided with lands 432, 434, 436 and 438 connected by neck portions of reduced diameter 440, 442 and 444, for cooperation with a number of fluid pressure lines including governor feed pressure line 446, main feed supply line 448, line 450, exhaust lines 452 and 454, and lines 456, 458 and 460. A spacer 462 is formed at one end on the land 438 and a piston 464 with a stem 466 at the other end. It will be noted that land 432 is slightly larger than lands 434, 436 and 438. The end land 438 of the valve is further provided with an orificed diagonally bored groove 468 for communication of fluid from either end of the land 438 to the other and on occasion to the sump through exhaust line 454.

The piston 464 is slidably received within an enlarged bore 470 of the valve body defining a fluid chamber 471, and is formed with an offset 472 defining a seat for one end of a compression spring 474 seated at its other end against a wall of the valve body. Surrounding the stem 466 and seated at one end against the offset 472 is a spring 476 seated at its opposite end against a reciprocating fluid pressure regulating plug 500. The plug 500 comprises lands 502 and 504 connected by a reduced neck portion 506 with spacers 508 and 509 formed at opposite ends, the spacers being aligned with the stub shaft or stem 466 so as to be in a position to be moved by or to cause movement of the shaft 466 in one direction or the other. The chamber 471 and plug 500 cooperate with suitable fluid pressure lines 510, 512, exhaust line 514 and vacuum modulated pressure line 516. The shift valve is provided for automatically and alternately controlling the supply of fluid at main line pressure to the brake or clutch mechanisms. This automatic operation is controlled by the force of governor pressure acting in one direction to be indicative of vehicle speed opposed by vacuum modulated line pressure, which is indicative of torque requirements.

The "shift valve" operates as follows. Vacuum modulated line pressure introduced in line 516 from the line 230 exerts a force against the left end of land 504 of the regulator plug to move the plug to the right against the action of spring 476 until lines 516 and 512 are connected and line 510 is blocked. Chamber 471 is then filled with fluid under pressure and a force is exerted both against the piston 464 and the right end of land 502 to both maintain the shift valve in the position shown and to attempt to move the plug 500 to the left. Because of the difference in area between lands 502 and 504, land 502 will move to the left until the line 510 is uncovered and line 512 blocked, whereupon the fluid will begin to drain through line 510 (this draining will be described later). The pressure in chamber 471 will then decrease until the pressure on land 504 is sufficient to again open line 512 and close line 510. This causes the plug 500 to have a fluid pressure regulating action whereby the p.s.i. force in chamber 471 will be less than the p.s.i. force on land 504 as long as line 510 is open to drain. Governor pressure is introduced through line 446 to act on the right side of the piston 464 to oppose the pressure in chamber 471.

In the position shown, land 432 of the shift valve blocks fluid pressure in line 448 from communicating with other parts of the control system. Any fluid pressure in line 450 is exhausted through an orifice 518 and line 452 to the sump. Line 460 is blocked by the land 438, with any fluid accumulated in the bore 520 and the space between the lands 436 and 438 draining to the sump through the diagonal bore 468 and line 454. The shift valve will remain in the position shown until governor pressure in line 446 acting on piston 464 has risen sufficiently to overcome the force of the fluid pressure in chamber 471 and the force of springs 474 and 476. When an increase in governor pressure beyond this point has been reached, the shift valve 176 fill move from the FIG. 3 position to the left to "shift" the valve and plug 500 (by stem 466) to their upshifted positions. This new position connects lines 448 and 450, line 510 and chamber 471, line 460 and chamber 520, and blocks lines 512, 458, and exhaust line 454. Therefore, the pressure in chambers 471 and 520 is drained through lines 510 and 460 to the sump through the downshift control valve 180 and detent valve 178 as will be clear later.

The shift valve will remain in its upshifted position as long as the pressure in line 446 plus the differential pressure acting on the right hand side of land 432 is greater than the pressure against the left-hand side of the piston 464, which at this time is only the force of the spring 474 and the pressure acting against land 504 of the regulator plug 500. The shift valve is "downshifted" by either reducing the pressure in line 446 sufficiently to permit the pressure acting on plug 500 plus the force of spring 474 to "shift" the valve to the right, or by raising the pressure in lines 510 and 460 to fill chamber 471 and act against piston 464 to overcome the action of the pressure in line 446 and chamber 520. Downshifting the valve returns the valve to its original position shown in FIGURE 3.

*Detent valve 178 and downshift control valve 180*

The detent valve 178 comprises a spool-type reciprocating valve slidably received within the bore 530 of the valve body and having a plurality of lands 532 and 534 of equal size connected by a reduced neck portion 536. The valve is baised into engagement with an accelerator pedal operated lever 538 by means of a spring 539 surrounding a spacer stem 541 fixed to land 532 and seated against one end of the valve bore 530 with its other end seated against the land 532. The lever is connected to the accelerator pedal by suitable means (not shown) and is adapted to be pivoted to the right by movement of the conventional accelerator pedal through the final stages of opening of the vehicle carburetor, corresponding to "flooring" of the accelerator pedal. The lands 532 and 534 control the communication of fluid between a number of fluid pressure lines as shown at 540 and 542, and exhaust lines 544 and 546 leading to the transmission oil sump.

Positioned to the right of the detent valve and in communication with the lines 540 and 542 is a downshift control valve 180 slidably received within a bore 559 of the valve body and having a land 560, a spacer 562 on one end, and a spacer plug 564 and stub shaft 566 formed on the opposite end extending into a chamber 568 defined by an enlargement of the bore 559. Seated on the spacer 564 and slidable on shaft 566 is an annular plate 572 of smaller diameter than the chamber 568 to permit fluid flow around the plate. The plate 572 is baised into engagement with the spacer 564 by a spring 574 seated at one end against the plate and at its opposite end against an annular fluid sealing plug 576 closing the end of the bore 559. A snap ring 578 prevents rightward movement of the plug. The left end of the bore 559 is provided with a fluid chamber 580 permitting the fluid pressure in lines 540 and 230 to act on the left end of plug 560, while the movement of plug 560 controls the connection between the line 542 and a number of fluid lines 582 and 584.

In the operation of valves 178 and 180, land 532 of valve 178 normally blocks fluid pressure in line 540, with the fluid in line 542 being connected to the sump through line 544. Until fluid pressure in line 230 overcomes the force of spring 574, land 560 of valve 180 is maintained in a position to the left of that shown and lines 582 and 584 and chamber 568 are emptied of fluid through line 542 around plate 572 to the sump through line 544. When plug 560 is moved to the right to the position shown to cover line 542 and uncover line 584, fluid under pressure enters lines 582 and 584 to fill chamber 568 thereby exerting a force on the plug to aid the spring in moving the plug to again uncover line 542. Thus, a regulating action of the valve is produced with a low pressure being fed to line 582. When lever 538 moves, land 534 closes exhaust line 544 and land 532 opens line 540 to fill line 542, chamber 568 and lines 584 and 582 with fluid at the pressure of the fluid in lines 540 and 230, this being possible because of the flow of fluid around the plate 572.

Therefore, initially, the two valves provide either zero or a low regulated pressure to line 582. When torque demands are great, as evidenced by a full depression of the accelerator pedal, the full pressure of the fluid in line 230 is fed to line 582 for a purpose to be described later.

*Governor mechanism 182*

The governor mechanism 182 in FIGURE 3A is shown comprising a plurality of upstanding ears 592 fixed to the output sleeve shaft 116 and connected by a pivot pin 596 to a mass 598 constituting a weight radially movable by centrifugal force upon rotation of the driven shaft. The weight 598 has a lug 600 abutting a substantially U-shaped member 602 slidably fixed on the output shaft 116 and bearing against a roller bearing 604 for controlling the output of fluid from a pressure feed conduit 606 to the governor feed conduit 446. A plate member 610, suitably provided in the transmission casing, has a restricted opening (not shown) of a specified area normally opened to a drain line (not shown) and closed by the roller bearing face plate 612 abutting thereagainst. The pressure of fluid communicated between the line pressure conduit 606 and the governor feed pressure line 446 will be determined by the relative position of the weight 598, i.e., the movement of the weight 598 outwardly by centrifugal force will begin closing the drain and allowing the pressure to build-up in the governor feed line 446 by movement of the bearing plate 612 to the left; this leftward movement will be opposed by the fluid pressure in line 606, the pressure in line 446 varying as a function of the force and the area until governor pressure in line 446 equals line pressure in line 606. Thus, an infinitely variable governor pressure is delivered to line 446 depending upon the speed of driven shaft 20.

*High speed clutch 18*

As seen in FIGURES 1 and 3A, the high speed clutch 18 comprises a plurality of friction clutch plates 114 splined to the gear carrier sleeve shaft extension 116 and mating with a plurality of similarly constructed friction plates 110 suitably splined to the drive shaft extension 112. Slidably mounted within the clutch housing defined by the shafts 116 and 112 is a piston 618 having formed thereon pins 620 slidably mounted within apertures 622 of the clutch housing. Each pin 620 is adapted to abut a pressure plate 624 also slidably mounted within the housing for engagement with the friction plates 114 to compress the same and plates 110 upon movement of the piston to the right by fluid pressure. The clutch housing is provided at 626 and 628 with suitable bores for cooperation with fluid conduits 630 and 632, the conduit 632 admitting fluid to the chamber 633 communicating with the clutch plates for cooling the plates when they are not in engagement with each other, and for disengaging of the same by moving pressure plate 624 to the left. A ball check valve 634 is provided for the priming of line 630 with fluid from line 632 upon disengagement of the clutch plates, while preventing the reverse flow of oil. The orifice adjacent the check valve creates a pressure differential on opposite sides of the piston 624 to permit torque converter pressure to disengage the clutch.

*Brake 16 and brake control valve 186*

As described previously in connection with FIGURE 1, the brake mechanism 16 is of the wash-out type and is shown having a piston 70 slidably connected to the transmission casing at 68 through a portion 72 of the housing. A plurality of conduits 636 and 638 are provided cooperating with suitable bores in the brake housing 640, 642, 646, 648, 650 and 652 for admission of fluid to opposite sides of the piston 94 for selective engagement of the cone brake elements 62 and 66.

The admission or exhaust of fluid to the brake mechanism is controlled by the rotary brake control valve 186, which is shown in FIG. 3A as viewed from the rear of the transmission. As indicated previously, the structure of FIG. 3A is of schematic nature for purposes of clarity and therefore does not necessarily show the exact relation of parts; for example, in the valve structure 186 the part 72 and the part 73 press-fitted thereto are in the nature of sleeves so that sleeve shaft 116 can be telescoped therewithin and in turn have shaft 112 telescoped therewithin. The schematic showing is used to simplify the fluid passages so that part 73 is not solid the passages associated therewith are axially disposed relative thereto.

As described in connection with FIGURE 1, the brake housing element 72 is splined to the transmission casing at 68. To provide a torque responsive rotary brake control valve that is subject to rotation upon a change in the direction of reaction on the gears of the gear set for controlling fluid flow, this splined connection is made such that excessive backlash is permitted, thereby permitting relative limited rotation of the two members. To accomplish this, every other spline on the connection to the transmission housing 68 is omitted, together with the omission of every other tooth on the brake housing element 72. This will be seen in FIG. 3A, wherein the transmission housing 68 is shown having a pocket 660, formed by omitting an adjacent tooth (not shown), cooperating with a tooth 662 formed on the brake housing element 72. A tooth normally formed on the element 72 adjacent tooth 662 has also been omitted so that the sleeve element 72 has a limited rotation in the pocket 660, the rotation being stopped at the ends of the pocket. The sleeve element 72 and support 73 press fitted therewithin are bored with suitable fluid channels 664, 666, 668 and 670 for cooperation with suitable ports 672, 674 and 676 provided in the housing 68 connecting with fluid pressure lines 458, 428, 362, 636 and 638, so that upon rotation of elements 72 and 73 in either direction, certain relationships between the fluid lines, ports and bores will exist.

This brake control valve 186 therefore operates to rotate the element 72 clockwise or counterclockwise depending upon the drive conditions established in the transmission to automatically control the supply and exhaust of fluid pressure to either side of the operating piston 70 of the brake 16. For example, if sun gears 40 and 42 are tending to rotate forwardly (which will be counterclockwise as viewed from the rear end of the transmission in relation to the showing of this valve) as would be the case in forward high speed drive, the viscous drag of the oil between the rotating cone brake element 62 and 66 and the holding element 72 cause the element 72 to be rotated counterclockwise in relation to the transmission housing to thereby close port 672. Conversely, reverse rotation of the sun gears rotates element 72 clockwise to open port 672. This valve plays an important part in the operation of the control system as a whole during downshifts, as will appear later.

Torque converter control valve 188

As seen in FIGURE 3B, the torque converter 12 is supplied with fluid under pressure through a conduit 700, with pressure above a predetermined amount being relieved through a pressure relief valve (not shown) to the fluid conduit 632 leading to the high clutch plate lubricating and cooling bore 633. The supply of fluid to the torque converter 12 is controlled by a torque converter control valve 188 shown as a reciprocating spool-type valve slidably received within a bore 702 in the valve body and having lands 704 and 706 of the same size connected by a reduced neck portion 708. A spacer lug 710 is provided at one end of the valve with a stub shaft 712 at the opposite end. The valve is normally biased to an open position by a spring 714 seated at one end against the land 706 and at its other end against a plug or stop pin 716 in the valve body. The bore 702 is provided with channels 718, 720, 722 and 724 for cooperation with suitable fluid conduits 726, the torque converter supply conduit 700, and conduits 728 and 730. Filling line 730 with fluid under pressure forces the valve to the left against the spring 714 to block lines 722 and 728 and uncover exhaust 726. The torque converter 12 then remains partially filled with fluid under a static pressure but under zero pump or line pressure.

High clutch control valve

The high speed clutch control valve 190 comprises a spool-type reciprocating valve 732 slidably received within a bore 734 in the valve body and having lands 736 and 738 connected by a reduced neck portion 740 with spacer lugs 742 and 744 provided on opposite ends of the valve. An enlarged bore 746 is provided at the left end of the valve 732 and has fixed therein an annular fluid sealing plug 748 adapted to stop leftward movement of the valve. The valve body is suitably bored for cooperation with a number of fluid conduits, namely, fluid feed line 450, exhaust line 762, and lines 764, 766 and 630. Abutting the plug 744 is a pin 770 formed as a part of a piston 772 slidably received within a reduced diameter bore 774 of the valve body. Piston 772 communicates at one end with a fluid conduit 776 leading to the transmission sump and on its other end with a fluid pressure accumulator 778. The accumulator comprises a piston 780 slidable within an enlarged bore 782 of the valve body and biased into engagement with the end of the bore by a number of differently rated springs 784. The bore 782 is closed at its other end by an annular apertured plug 786 abutting a snap ring 781, the aperture permitting the exhaust of fluid within the hollow piston 780 to the transmission oil sump. The face 788 of the piston is recessed as shown to provide a fluid chamber 790 communicating through an orificed line 791 with the line 764.

The high speed clutch control valve and accumulator operates as follows.

Admission of fluid pressure through line 450 to the valve 190 fills line 766 and causes fluid pressure to act on the end of land 736 to move it to the right. The fluid then fills chamber 794, line 764 and line 630 to exert a force on the end of land 738 thereby stopping the movement of the valve with the valve in its open position. Under these conditions, the pressure in lines 764 and 630 will be the same (line pressure). The fluid in line 764 simultaneously slowly begins to fill chamber 790 through orificed line 791 leading to the fluid pressure accumulator 778 and piston 772, the line 791 being small enough to prevent a noticeable drop in pressure in line 764. The filling of chamber 790 causes the fluid pressure to act on both pistons 772 and 780 to move them both simultaneously in opposite directions, the movement of the piston 780 being opposed by the combined force of springs 784. Leftward movement of piston 772 increases the force on land 738 to move it leftwardly until line 766 is closed and line 764 is open to exhaust line 762. The pressure in lines 764 and 630 therefore immediately drops until the pressure on the plug 736 is great enough to move the valve to the right to open line 766 to line 764. The valve 732 will then have a pressure regulating action, with the pressure in line 764 slowly decreasing as the accumulator piston 780 moves further to the right until the piston 780 has stroked its full limit, whereupon a minimum operating pressure in line 764 is reached.

The clutch control valve is a pressure reducing valve for the following reason. For any given friction clutch, the torque capacity is determined by the coefficient of friction, (c./f.), number of plates, surface area, the engaging force, etc. During initial engagement, there must be an excess of clutch torque carrying capacity over that of the engine torque requirements to take care of the inertia flywheel effects of decelerating the engine. Also, there must be an excess after final engagement thereof for a safety factor. Since the design point is determined by the torque carrying capacity requirements at initial engagement or maximum slip speed, which is the difference in speed between the drive and driven members of the clutch, and since the c./f., which is the ratio of the tangential force to the normal force, varies inversely with the slip speed and increases rapidly with a decrease in the slip speed to zero slip speed differential, the excess in torque carrying capacity likewise increases rapidly as the point of final engagement is approached such that an undesirable value of the torque capacity is obtained resulting in final engagement of the clutch with a noticeable jerk or jolt. This invention eliminates this effect by lowering the excess torque carrying capacity at final engagement so that final engagement is made smoothly and gently. An example will serve to clarify this. Assume that the clutch torque carrying capacity is 150% of engine torque requirements at initial engagement. If the c./f. is .10 at this time and .15 at final engagement, the relative clutch capacity at final engagement will be 225% of the engine torque requirements or an excess of 125%. It is this 125% excess that produces the undesirable jolt.

Since the torque capacity varies directly with the pressure, the torque capacity can therefore be reduced by reducing the pressure. If the normal force at final engagement, which is a function of line pressure, is reduced to say 75%, for example, of what it is at initial engagement, then the clutch torque capacity at final engagement would be reduced to approximately 169% of what it was at initial engagement. That is, if the pressure is reduced 75% at final engagement, then the torque capacity at final engagement would have an excess of 69% over the engine torque requirements, which is enough to take care of the flywheel inertia effects, safety factor, and yet give a satisfactory engagement without jerk or jolt. The clutch control valve effects the desired reduction in final pressure to reduce the excess torque capacity by supplying fluid pressure to initially engage the clutch plates at, for example, 100 p.s.i., with a c./f. of say, .10. The accumulator 778 creates a time interval for the slip speed to decrease to zero, and therefore an interval to vary the pressure. Thus, after the accumulator piston 780 has bottomed, the pressure will have been gradually reduced to 75 p.s.i., for example, the c./f. at this time being, say, .15.

*Operation*

*Engine dead.*—With the vehicle stationary and the engine dead, the drive shaft pump 140 will remain stationary, and no fluid will be delivered to the control system through supply line 154 regardless of the position of the manual valve 172. Therefore, the brake elements 62 and 66, clutch 18 and the vibration dampening means 136 will remain in their normal disengaged positions, and the vehicle will remain stationary.

*Neutral—Engine running.*—Upon movement of the manual valve 172 to the N or neutral position as shown in FIG. 3A, and upon starting of the engine, drive shaft pump 140 rotates clockwise as seen in FIG. 3B to draw fluid from the transmission sump through conduits 152 and 144 to deliver the same under pressure through the supply conduit 146 to the main supply line 154, the check valve 156 at this time seating to prevent communication of the fluid to the driven shaft pump 142.

The fluid in line 154 is simultaneously fed through lines 232 and 240 to fill chambers 222 and 229, respectively, of the pressure regulator valve 168. The fluid in chamber 229 moves the pressure regulator valve to the left against the opposition of spring 266 to provide a regulated pressure in chamber 222 as described previously. In the movement of the valve to the left, chambers 222 and 224 are connected filling line 234. This causes (1), the filling of torque converter 12 with fluid under pressure through the line 728, the open torque converter control valve 188 and converter feed line 700; (2), cooling the clutch plates of the clutch 18 by the discharge of fluid through a pressure relief valve (not shown) to line 632; and (3), the filling of lines 630 and 764 through the open clutch ball-check valve 634. The orifice 237 (connecting with line 728) at this time prevents a drop in pressure in the line 234 through the governor feed line 606, which at this time is connected to the drain.

In filling chamber 222 of the pressure regulator valve, the fluid is fed through orifice 254 and channel 252 of boss 250 to fill chamber 219 and line 230. Assuming a closed throttle position of the accelerator pedal and maximum engine vacuum, the vacuum in line 294 will be a maximum with a resultant zero force on the plug 284. Therefore, any fluid pressure on the plug 272 will unseat the same and drain the fluid in chamber 219 to the sump thereby maintaining a zero fluid pressure in chamber 219 and line 230. The pressure regulator valve thus provides a regulated predetermined pressure in lines 233 and 234, with channel 254 being of a small enough size to prevent a noticeable drop in the pressure in chamber 222 and line 233.

The fluid in line 233 is supplied to the manual valve 172 wherein it is blocked from further communication with the control system by the positions of the lands 324 and 326. Thus, no fluid is supplied to the brakes or clutches.

The transmission is thus conditioned for neutral operation with the brake elements 62 and 66 and direct drive clutch 18 disengaged, and torque converter 12 filled. The engine will be idling at this time causing pump 24 to rotate turbine 26, ring gear 34 and turbo-stator 28 forwardly or clockwise as viewed from the left of FIG. 1, with the sun gears 40 and 42 being rotated counterclockwise, there being no reaction member in the transmission other than the output shaft 20. Therefore, the carrier 38 and output shaft 20 remain stationary with no torque being transmitted from the drive to the driven shafts.

*Forward speed operation—Drive range.*—Movement of the manual valve 172 one position to the right of that shown in FIGURE 3A to position pin 342 in alignment with the Dr designation conditions the transmission for forward automatic operation. This positions land 322 to close off the left end of the valve body, with land 324 connecting the regulated fluid pressure in line 233 to lines 360 and 362. The regulated pressure from line 233 immediately fills line 360 to feed pressure through line 448 and an orifice 449 to the shift valve 176 where it is blocked by land 432, and through line 410 to fill chamber 406 of the fluid pressure accumulator 174 moving the piston 392 to the right until stopped by the plug 402. Fluid pressure is also immediately fed through line 362, branch line 238 and orifice 244 to begin filling chamber 228 of the pressure regulator valve, and through port 676 of the brake control valve 186, lines 670, 638, 648, 650 and 652 to fill the chambers on the right side of the brake piston elements 94 thereby moving the piston 70 to the left and engaging the cone brake element 62 to the transmission casing. Since the force necessary to cause the engagement of the brake elements with the casing is necessarily higher than is needed to maintain the brakes engaged, the additional force on land 204 moves the pressure regulator valve to the left to decrease the regulated pressure in lines 233 and 234 and therefore in lines 360 and 362. The orifice 244 acts as a damping device to prevent undue "buzzing" or fluttering of the pressure regulator valve back and forth.

The transmission is now conditioned for low speed forward drive with brake 62 engaged to hold sun gears 40 and 42 stationary, and brake 66 and direct drive clutch 18 disengaged. The clockwise rotation of the drive shaft 10 will drive the pump 24 and therefore turbine 26 clockwise to drive ring gear 34 in the same direction. Sun gears 40 and 42 now act as reaction members with the carrier 38 attempting to planetate thereabout. However, with the engine idling, the drive to the ring gear 34 is insufficient to overcome the load on the output shaft 20 and the vehicle remains stationary. Upon depression of the accelerator pedal, the speed of pump 24 increases to increase the turbine and ring gear speeds to cause movement of the output shaft 20 in a clockwise direction driving the vehicle forwardly at a speed reduced from that of the speed of drive shaft 10. Upon torque being applied to the gear set 14, the gear set is moved as a unit to abut the portion 138 of race 50 of one-way device 46 against the flexplate 128 to disengage the vibration dampening device. Such movement is due to the pitch of the teeth of the meshing gears and the forces applied thereto.

Referring to the control system as seen in FIGURE 3B, depression of the accelerator pedal causes the engine to decrease the vacuum in line 294 to increase the spring force on the plug 284 thereby building up the pressure of the fluid in chamber 219 of the pressure regulator valve and line 230.

The pressure in line 230 acts on the shift valve regulator plug 500 through line 516, the detent valve 178 through line 540 where it is blocked from further flow by land 532, and the downshift control valve 180 through chamber 580. Assuming that the loading of spring 574 of the downshift control valve is 70 p.s.i., for example, and that the maximum pressure available in the vacuum modulated line 230 is 80 p.s.i., for example, as long as the accelerator pedal is not depressed sufficiently to cause the engine to change the value of the vacuum and therefore the pressure in line 230 above 70 p.s.i., any depression of the accelerator pedal up to this point will only affect movement of the shift valve regulator plug 500 since line 542 will connect lines 584, 582 and lines 460 and 510 to the sump through exhaust 544. Therefore, below 70 p.s.i., the pressure in line 516 moves the pressure regulator plug 500 to the right to fill chamber 471 and exert a force on the piston 464 in proportion to the movement of plug 500, which at this time will have a regulating action. Further decreasing the engine vacuum to increase the pressure in line 230 beyond 70 p.s.i. moves the downshift control valve plug 560 against the spring 574 to produce a low regulated pressure in lines 510 and 460. However, with the plug 500 to the right connecting lines 516 and 512, the pressure in line 510 has no effect at this time. If the accelerator pedal is fully depressed to move lever 538 to the right to connect lines 542 and 540, and the engine vacuum decays to zero, the maximum pressure of 80 p.s.i., for example, will be fed through line 542, chamber 568 of the downshift control valve, and lines 584 and 582 to fill lines 510 and 460 with fluid at 80 p.s.i. pressure. At the same time, fluid at 80 p.s.i. pressure will be acting on the land 504 of the regulator plug 500 so that the chamber 471 is assured of being filled with fluid under maximum pressure from either line 512 or 510 depending upon the resultant movement of plug 500. It will be seen therefore, at this time, that the fluid pressure in chamber 471 will be changed according to the change in engine vacuum and the degree of depression of the accelerator pedal. It will be evident that the increasing pressure in chamber 219 of the pressure regulator valve will also proportionately increase the regulated pressure in lines 233 and 234 since movement of the valve to the right by this increased fluid pressure will require a higher pressure level in chambers 222 and 228 before the valve reaches its equilibrium position between opening and closing of the sump line 231.

With the vehicle now in motion, the mass 598 of the centrifugal governor mechanism 182 begins moving radially outwardly to build-up a pressure in line 446 leading to the chamber adjacent the right-hand side of the piston 464 to attempt to move the piston to the left in opposition to the fluid pressure and spring force in chamber 471.

When the vehicle speed has reached a value such that the governor fluid pressure on piston 464 is sufficient to overcome the force of spring 474 and the fluid pressure in chamber 471, the shift valve will move to the left to its "upshifted" position. The new position of the shift valve blocks line 512 by movement of the regulator plug 500 to the left, connects line 510 and chamber 471, connects the regulated main line pressure source in line 448 to line 459, blocks exhaust lines 452 and 454, and opens line 460 to chamber 520 behind the shift valve. Since land 432 of the shaft valve is larger than land 434, a differential force will be exerted on land 432 by the fluid pressure in line 448 to aid the governor pressure in maintaining the shift valve in its new position. If the accelerator pedal is still fully depressed and engine vacuum is a minimum, the pressure in lines 510 and 460 will still be 80 p.s.i. However, if the accelerator pedal is partially released and the vacuum rises, the detent valve 178 will close connecting line 542 to exhaust, and, depending upon whether the pressure in line 230 is above or below 70 p.s.i., the pressure in lines 460 and 510 will then decrease to a low value or to zero, as the case may be.

The moving of the shift valve to its "upshifted" position signifies that the transmission is ready to change from a reduction drive ratio to a direct drive ratio. Such a change calls for the brake element 62 to be released and the brake 16 neutralized, the supply of fluid at main line pressure to the torque converter to be stopped, and the clutch 18 to be engaged. This is accomplished in the following manner. Upon connecting lines 448 and 450 at the shift valve, the reverse servo brake apply chambers to the left of the brake piston elements 94 will be filled with fluid pressure through line 450, 236, branch line 388, open metering valve 378, line 368, past manual valve land 328 to lines 366, 428, and port 674 to lines 666, 636 and ports 640, 642 and 646. Filling of these chambers moves the piston 70 to the right with the help of the centering wave spring 647 to "wash out" the effect of the fluid in the chambers on the opposite sides of piston portions 94 and center the piston, thereby neutralizing the brake 16 with both brake elements 62 and 66 disengaged. Simultaneously with the flow of fluid under pressure to the brake, the fluid in line 428 is also fed to the metering valve 420, to seat the valve 422 and thereby slowly build up the pressure in chamber 408 of the accumulator 174. The workable area in chamber 406 on the left side of piston 392 is approximately 10% less than that on the right side of the piston in chamber 408; therefore, the piston will be slowly moved to the left by the pressure in chamber 408 until the stem 394 is bottomed against the valve body. At this time, the pressure in chamber 408 will be equal to the source pressure in line 448.

At the time fluid is fed to the brake 16, the supply line 450 simultaneously feeds fluid under pressure to the high speed clutch control valve feed line 766 and the torque converter control valve chamber 724. The torque converter valve 188 is then moved to the left against the force of spring 714 to block the supply of fluid under pressure to the torque converter 12 and reduce the pressure therein to substantially zero pump pressure by connecting the line 700 to exhaust through line 726. The fluid in line 450, meanwhile, forces the high speed clutch valve 732 to the right to connect lines 766, 764 and 630 to initially engage the clutch plates 110 and 114. Fluid is also fed slowly through line 791 to begin moving both the piston 772 and accumulator piston 780 thereby slowly decreasing the engaging pressure in line 630. Reduction of pressure in the clutch apply line 630, as previously described in connection with the description of the clutch control valve per se, occurs due to the increasing leftward movement of the plug 772 by the increased pressure of the fluid in chamber 790 of the accumulator.

By the time the piston 392 of the fluid pressure accumulator 174 has bottomed against the valve body, the brake 16 will have been completely disengaged, the high clutch control valve accumulator piston 780 will have bottomed against the plug 786 and the final engagement of the clutch plates at the reduced pressure in line 630 will have been completed.

Since the fluid pressure necessary to maintain the direct drive clutch 18 engaged is less than the normal engaging pressure, fluid pressure also acts through lines 450, 236 and damping orifice 242 to fill chamber 226 of the pressure regulator valve, thereby acting on the differential area between lands 204 and 212 to move the valve to the left and lower the regulated pressure in lines 233 and 234.

The transmission is now conditioned for high speed forward operation with the direct drive clutch 18 engaged connecting shafts 116 and 112, brakes 62 and 66 disengaged, and the pump pressure of the fluid in the torque converter 12 reduced to zero. With the drive shaft 10 and pump 24 already rotating clockwise at a substantial speed, turbine 26, ring gear 34, turbo stator 28 and sun gears 40 and 42 will be likewise driven at approximately the same speed and in the same direction, since the carrier 38 and pump 24 are rotating at the same speed. The gear set is thus substantially locked up. Under such conditions, with the release of driving torque to the gear set, the gear set is caused to move to the right as a unit to disengage face 138 of the one-way device 46 from the flexplate 128 thereby causing engagement of the vibration dampening means 130 with the drive shaft extension assembly 134. Such movement is due to the pitch of the teeth of the meshing gears and the forces applied thereto. Referring to the brake 16 and brake control valve 186 in FIGURE 3A, the forward rotation of the sun and ring gear elements rotates the brake elements 62 and 66 in the same direction (counterclockwise as seen from the rear in FIG. 3A). Because of the viscosity of the oil film between the brake elements and the piston 70, a counterclockwise movement is imposed on the brake element 72 thereby moving this element to the left to block port 672.

While the upshift to direct drive just described occurred with either partial or full depression of the accelerator pedal, it will be clear that an upshift to direct drive can be effected at a lower governor pressure and vehicular speed than described. If the operator has accelerated the vehicle sufficiently to raise the governor pressure on the piston 464 of the shift valve sufficiently to overcome the force of spring 474, by suddenly releasing the accelerator pedal to a closed throttle condition, the shift valve will be "upshifted." The sudden release of the accelerator pedal reduces the torque and causes the engine to raise the vacuum in line 294 to decrease the force on plug 272 of the pressure regulator relief-valve mechanism 258 to approximately zero thereby reducing the pressure in chamber 219 and line 230 to zero. The shift valve regulator plug 500 then is moved to the left by spring 476, and the fluid under pressure in chamber 471 is drained to the sump through lines 510, 582, 584 and around plate 572 of valve 180 to line 542 connected to the exhaust line 544 of the detent valve 178. The shift valve is then upshifted.

Above vehicle speeds of approximately 72 m.p.h., the force exerted by the governor pressure on the shift valve will always be sufficient to maintain the shift valve upshifted regardless of the degree of depression of the accelerator pedal.

When the transmission is in direct drive condition, a "downshift" to reduction drive may be made in one of several ways. At vehicle speeds between approximately 55–72 m.p.h., the governor pressure in line 446 is great enough so that the shift valve can only be downshifted by means of a "detent" full throttle downshift. A "detent downshift" under power to reduction drive to obtain greater acceleration than is normally provided in the direct drive range may be accomplished by depressing the accelerator pedal to the floor. "Flooring" the accelerator pedal causes the engine to decrease the vacuum in line 294 to approximately zero permitting the full force of spring 288 to act on the plug 272 and pressure regulator valve thereby raising the pressure of the fluid in chamber 219 and line 230 to a maximum (80 p.s.i.). The high pressure in line 230 acts through line 516 on the land 504 of the shift valve regulator plug 500. With the shift valve in its upshifted position, the force on land 504 of the plug in combination with the force of spring 474 alone is insufficient per se in this speed range to overcome the governor and main line pressures acting on the piston and land 432, respectively. However, the 80 p.s.i. pressure in line 230 moves land 560 of the downshift control valve 180 to the right against the 70 p.s.i. load of spring 574 to admit fluid pressure at 10 p.s.i. to the chamber 568; whereupon the spring plus the force of the fluid pressure moves the land 560 leftwardly in an attempt to provide a regulating action of the valve. With the accelerator pedal pressed to the floor, lever 538 moves the detent valve 178 to the right to connect the high pressure in line 540 to line 542. Upon opening of the line 542, fluid pressure at 80 p.s.i. flows around plug 564 and the plate 572 of the downshift control valve to enter lines 584, 582, 510 and 460. With the shift valve upshifted, fluid pressure at 80 p.s.i. enters and fills chamber 471 and 520, respectively. Since the speed range (55–72 m.p.h.) is below that critical speed above which the governor pressure is great enough so that a downshift cannot be made, the fluid pressure acting on the piston 464 will be sufficient to downshift the valve to its original position shown in FIGURE 3.

This new or reduction drive position will cause disengagement of the clutch 18 by draining of the fluid therein, and engagement of the forward brake 62. Connecting clutch apply line 450 to exhaust through line 452 drains both the fluid in the line leading to the clutch control valve 190 and the line 730 leading to the chamber 724 of the converter control valve 188. The converter valve therefore immediately is moved to the right by spring 714 to again supply fluid under pressure to the torque converter 12 through lines 234 and 700. Low pressure fluid is also supplied through line 632 and bore 628 to cool the clutch plates 114 and 110 and move the clutch apply pistons 624 and 618 to their disengaged positions.

At the same time, the drain of fluid in lines 766 and 450 causes the clutch control valve 732 to be moved to the left by the pressure of fluid in line 630 thereby draining the fluid in this line and chamber 790 to exhaust through line 764 and 762.

When the change from direct drive to reduction drive is made under power, the engine must speed up to a new value to maintain and increase the vehicle speed, as previously described. Therefore, the fluid pressure in the reverse servo brake apply chambers on the left side of piston elements 94 of brake 16 immediately begin to drain through lines 640, 642, 646, 636, 666, port 674, line 428, lines 366 and 368 through the orifice 386 and line 388 to line 450. Also at this time, the fluid pressure in chamber 408 of the accumulator 174 will be draining through the metering valve 420 and line 366 to line 450 and the exhaust line 452. When this reverse brake apply pressure has decayed to approximately 90% of its former valve, the pressure in chamber 406 of the accumulator 174 will be sufficient to move the piston 392 to the right to displace the quantity of fluid lost in line 428 thereby momentarily maintaining the pressure in the reverse apply chambers at this value. This momentary delay in the decay of the fluid pressure enables the engine to accelerate to its new setting appropriate for a reduction drive before full application of the forward brake element 62. Upon the fluid accumulator piston 392 bottoming upon the plug 402, the pressure in the reverse servo apply chambers immediately decays to cause movement of the brake piston 70 to the left to engage cone brake element 62. The torque converter now being filled with fluid under pump pressure drives the ring gear 34 clockwise and, with the carrier temporarily acting as a reaction member, attempts to drive the forwardly rotating sun gears backwardly. The fluid pressure accumulator 174, as previously described, is so designed that it maintains the fluid pressure in the reverse servo apply chambers at 90% of the pressure in the forward servo apply chambers until the sun gears have become stationary. This 10% differential pressure in the forward servo chambers is thus enough to move the piston 70 to the left to bring the brake surfaces 78 and 82 into initial contact for the interval desired. As soon as the sun gears tend to rotate rearwardly, the reaction on element 72 of the brake control valve moves the element 72 clockwise (since valve 186 is viewed from the rear of the transmission) to open port 672. Thereafter, the fluid in lines 636, 666 and 428 immediately exhausts through port 672 and line 458 to the sump through line 456 permitting the line pressure in the forward brake apply chambers on the right side of piston elements 94 to increase the effectiveness of the forward brake element 62 from a 10% engaged condition to 100% engaged. The fluid pressure in chamber 226 of the pressure regulator valve by this time has drained through the orifice 242 and line 450 to further increase the regulated pressure in lines 233 and 234. This provides a higher pressure in the forward brake apply chambers of the brake 16 to maintain the brake engaged under the increased torque demand.

Under these conditions, forward brake 62 will be engaged, the reverse brake 66 and direct drive clutch 18 disengaged, and the torque converter 12 filled with fluid under pressure. The transmission is now in reduction drive and torque is transmitted through the gear set from the drive shaft 10 to the driven shaft 20 in the same manner as described previously for reduction drive.

Upon maintaining the accelerator pedal in its fully depressed detent position, the transmission will again upshift to direct drive upon a decrease in the pressure in line 230 by a build-up in the engine vacuum and the vehicle speed and therefore governor pressure reaching the predetermined maximum as described in connection with a full throttle start. The transmission may also be returned to direct drive as soon as the need for acceleration is completed and before the critical speed is reached by releasing the accelerator pedal to a partially closed position thereby reducing the pressure in chamber 471 below the governor pressure and returning the shift valve to its upshifted position.

At vehicle speeds between 25–55 m.p.h., in addition to a detent downshift, a downshift from direct drive to reduction drive may also be made under full throttle less detent conditions. In this case, depression of the accelerator pedal to wide open position causes the engine to decrease the vacuum in line 294 to approximately zero as in the case of a full throttle detent downshift, thereby raising the pressure of the fluid in chamber 219 and line 230 to a maximum (80 p.s.i.). This 80 p.s.i. pressure acts through both line 516 against the land 504 of the shift valve regulator plug 500, and against the land 560 of the downshift control valve 180. Land 560 is therefore moved to the right against the 70 p.s.i. load of spring 574 to a regulating position of the valve to admit fluid pressure at 0–10 p.s.i. to the lines 584, 510, 460 and chambers 471 and 520. The fluid in chamber 471 therefore acts against the piston 464 in cooperation with the force of spring 474 and the pressure on land 504 of the shift valve regulator plug 500. These forces combined are sufficient in this speed range to overcome the effect of the governor pressure in line 446, the line pressure differential force acting on land 432, and the pressure in chamber 520 from line 460 to downshift the valve and therefore effect a change from direct drive to reduction drive by application of the brake 62 and disengagement of the clutch 18 in the manner similar to that described in connection with the detent downshift.

Between vehicle speeds of say 25–15 m.p.h., a downshift may also be effected under partially opened throttle conditions without involving the operation of the downshift control valve. That is, in this speed range, a pressure of 70 p.s.i. or under, depending upon the speed, in line 516 against land 504 is sufficient in combination with force of spring 474 to overcome the force of the governor pressure and the differential line pressure force acting on piston 464 to downshift the valve to its original position shown in FIGURE 3.

Below 15 m.p.h. vehicular speeds, a downshift may also be made under closed throttle conditions since the force of spring 474 alone is sufficient at this time to downshift the valve against the action of the governor pressure and differential main line pressure. The transmission will then be conditioned for reduction drive as previously described.

Conversely, below 15 m.p.h., a downshift from direct drive to reduction drive may be made under detent downshift conditions, full throttle less detent downshift conditions, partially opened throttle conditions, and fully closed throttle conditions. Between 15–25 m.p.h., a downshift may be made under partially opened throttle conditions, full throttle less detent conditions, and detent downshift conditions. Between 25–55 m.p.h., a downshift can be effected only under full throttle less detent or detent downshift conditions. Between 55–72 m.p.h., a downshift may be made only under full throttle detent conditions.

Because of the added force of the line pressure in line 448 acting on land 432 to maintain the shift valve in its unshifted position, a hysteresis effect will be established to vary the time between upshifts and downshifts, i.e., under the same throttle conditions, a lower governor pressure is necessary before the shift valve is downshifted than when it is upshifted.

*Forward speed operation—Lo range.*—Movement of the manual valve 172 to align pin 342 with the Lo indication moves land 322 to connect the shift valve feed line 360 to the transmission sump to prevent engagement of the direct drive clutch 18 or disengagement of the forward brake 62. This is the only change from the operation of the transmission in the Dr range since the other lands 324, 326, 328 and 330 though moved, do not change the port connections. Thus, as long as the manual valve is in the Lo range of operation, the transmission is maintained in a reduction drive regardless of vehicle speed.

*Forward coast.*—With the vehicle moving forwardly in reduction drive, release of the accelerator pedal to permit coast of the vehicle will cause output shaft 20 and therefore carrier 38 to attempt to drive both the ring gear 34 and sun gears 40 and 42 forwardly. Since the sun gears are held by brake 62, the ring gear and turbine 26 will be driven forwardly at an overdrive ratio to attempt to drive the pump 24 faster than it is being driven by the engine. Engine braking is therefore provided as well as reaction in the gear set to retard further forward travel of the vehicle. At the same time, forward reaction on the sun gears will cause brake control valve element 72 to be rotated counterclockwise to close off port 672 communicating with line 458 and the transmission sump by means of line 456.

With the vehicle in direct drive, forward coast of the vehicle will rotate both the sun gears and ring gear forwardly thereby providing some engine braking because of the effect on the pump of the torque converter due to the faster rotation of the turbine-stator 28 and turbine 26, respectively. In this case, the brake control valve element 72 already blocks off port 672 and therefore does not have a further movement.

*Reverse.*—Reverse drive is established by engaging cone brake element 66 to hold turbine 26 and ring gear 34 stationary while disengaging the forward brake element 62 and direct drive clutch 18. Moving the manual valve 172 to position pin 342 opposite the R position moves land 322 to the left to open the end of the manual valve. The fluid in line 360 leading to the shift valve and line 362 leading to the forward brake apply chambers 97 is thereby drained to the transmission oil sump. Lands 324 and 326 of the manual valve move to the left to admit fluid pressure from line 233 to lines 364 and 366 leading to the reverse brake apply chambers 95 through the brake control valve port 674 and lines 666, 636 and 640 thereby moving the piston 70 to the right and engaging the reverse cone clutch element 66. At the same time, fluid in line 366 slowly fills chamber 408 of the fluid pressure accumulator 174 through line 428 and the metering valve 420 to bottom the piston 392 against the left-hand side of the valve body. Land 330 of the manual valve likewise blocks the exhaust of the fluid in lines 456 and 458 leading to the brake valve control port 672. Any fluid pressure in chambers 226 and 228 of the pressure regulator valve are likewise drained to the sump to provide a high regulated pressure in lines 233 and 234.

Under these conditions of operation, the cone brake element 66 will be slowly engaged to hold turbine 26 and ring gear 34 stationary. The transmission will now be conditioned for reverse speed operation. Rotation of the input shaft 10 will rotate pump 24 forwardly. Fluid leaving the stationary turbine will rotate the turbo-stator 28 backwardly engaging one-way device 46 to rotate sun gears 40 and 42 rearwardly. With ring gear 34 stationary to act as a reaction member, the reversely rotating driving sun gears 40 and 42 will cause the carrier 38 to planetate about the ring gear and drive the shafts 118, 116 and 20 rearwardly and at a speed reduced from that of the speed of drive shaft 10. As an incident to this reverse rotation, the attempt by the ring gear 34 to rotate forwardly rotates element 72 of the brake control valve to the left to block off port 672 and further prevent the draining of fluid through line 458.

*Reverse coast.*—With the vehicle operating in reverse drive, release of the accelerator pedal by the operator will result in the carrier 38 becoming the driver with the sun gears 40 and 42 being the followers. Under such a condition, one-way device 46 disengages and the sun gears 40 and 42 are driven backwardly at an overdrive ratio. At the same time, the carrier attempts to drive the ring gear in the same direction, thereby rotating the brake control valve element 72 clockwise to open port 672 to condition the brake control valve for rapid disengagement of the reverse brake upon movement of the manual valve to a forward drive setting. If the manual valve is not moved, no change is made in the condition of the transmission since land 330 of the manual valve still blocks the connection to the sump.

*Park.*—Movement of the manual valve to the extreme left aligns pin 342 with the P position and moves lands 324 and 328 to prevent fluid in line 233 from reaching any of the clutch or brake mechanisms. This condition of the transmission corresponds to the "Neutral" position already described. However, upon movement of the manual valve to this position, the slidable pawl 124 is engaged with the gear 122 on the output shaft to positively prevent movement of the vehicle.

The description herein of the preferred embodiment of the invention for the purpose of illustrating the principles thereof is not to be considered as limiting the invention, since modifications thereof within the scope of the invention will occur to those skilled in the art.

We claim:

1. A transmission having an input shaft, an output shaft, and gearing intermediate said shafts, said gearing having drive, driven and reaction members, said driving member being operatively connected to said input shaft, means connecting said driven member and said output shaft, clutch means for connecting said members for substantially unitary forward rotation, means for effecting engagement and disengagement of said clutch means, the application of torque to said driving member upon disengagement of said clutch means causing reverse rotation of said reaction member, brake means for preventing reverse rotation of said reaction member, and means controlled by reverse rotation of said reaction member for delaying the full engagement of said brake means until the forward rotation of said reaction member has terminated and the reverse rotation is initiated.

2. A transmission having an input shaft, an output shaft, and gearing intermediate said shafts, said gearing having rotatable drive, driven and reaction members, means connecting said drive member and said input shaft, means connecting said driven member and said output shaft, fluid pressure actuated brake means to prevent reverse rotation of said reaction member to establish a reduction drive through said gearing, fluid pressure actuated clutch means connecting said input and output shafts to provide a direct drive with substantially unitary forward rotation of said members, and control means for controlling the selective engagement and disengagement of said brake and clutch means, said control means including a source of fluid under pressure, conduit means connecting said source and each of said brake and clutch means for actuation thereof by the fluid from said source, a shift valve in said conduit means movable between open and closed positions for controlling the flow of fluid from said source to said brake and clutch means, said shift valve in its open position effecting engagement of said clutch means while permitting disengagement of said brake means and vice versa in its closed position, and means controlled by reverse rotation of said reaction member to delay the full engagement of said brake upon movement of said shift valve to its closed position until the forward rotation of said reaction members has terminated and the reverse rotation thereof initiated.

3. A transmission as in claim 2 wherein said timing means comprises a fluid pressure accumulator interposed in said conduit means between said source and said brake and clutch means.

4. A transmission having a stationary casing, an input shaft, an output shaft and gearing intermediate said shafts, said gearing having drive, driven and reaction members, means connecting said input shaft and said drive member, means connecting said output shaft and said driven member, brake means movable by fluid under pressure between engaged or disengaged positions for holding said reaction members stationary or permitting rotation thereof, and means connecting said casing and said brake means for limited relative rotation therebetween for controlling the engagement and disengagement of said brake means, said means comprising a valve having one portion connected to said casing and a second relatively rotatable portion connected to said brake means, a source of fluid under pressure, means connecting said source, valve and said brake means, said relatively rotatable valve portion in one position controlling the supply of fluid from said source to said brake for effecting disengagement thereof by said fluid under pressure, said valve portion in another position controlling the exhaust of fluid from said brake to effect engagement thereof.

5. A transmission having a casing, an input shaft, an output shaft and gearing intermediate said shafts, said gearing having drive, driven and reaction members, means connecting said drive member and said input shaft, means connecting said driven member and said output shaft, hydraulically actuated brake means movable between engaged and disengaged positions for holding said reaction member stationary when engaged to provide a reduction drive through said gearing, means connecting said brake means and said casing, and control means in said connection between said brake means and said casing responsive to the direction of rotation of said reaction member for controlling the hydraulic engagement of said brake means.

6. A transmission having a casing, an input shaft, an output shaft and gearing intermediate said shafts, said gearing having drive, driven and reaction members, means connecting said drive member and said input shaft, means connecting said driven member and said output shaft, the application of torque from said input shaft causing rotation of said reaction member in a direction opposite to the rotation of said input shaft, fluid pressure actuated brake means for preventing reverse rotation of said reaction member, means connecting said casing and said brake means, and control means in said connection between said brake means and said casing responsive to the direction of rotation of said reaction member for controlling the engagement and disengagement of said brake means, said means comprising a sleeve valve having a plurality of portions, one of said portions being connected to said casing with a second portion being connected to said brake means, said portions having limited relative rotation therebetween.

7. A transmission having an input shaft, an output shaft, and gearing intermediate said shafts, said gearing having drive, driven and reaction members, means connecting said drive member to said input shaft, means connecting said driven member to said output shaft, fluid pressure actuated clutch means connecting said input and output shafts for unitary forward rotation of all of said members, fluid pressure actuated brake means for holding said reaction member stationary to provide a reduction drive from said gearing, the application of torque from said input shaft to said gearing causing rotation of said reaction member in a direction opposite to the direction of rotation of said input shaft upon disengagement of said clutch means, and means for delaying the engagement of said brake means upon disengagement of said clutch means until the forward rotation of said reaction member is terminated and the reverse rotation initiated, said means including a source of fluid under pressure, a shift valve movable between open and closed positions, means connecting said source and said brake and clutch means through said shift valve, a rotary brake valve rotative in opposite directions in response to the direction of rotation of said reaction member for controlling the flow of fluid to and from said brake means, conduit means connecting said shift valve, brake control valve, and said brake means, and a fluid pressure accumulator interposed in the conduit between said shift valve and said brake control valve, said shift valve in its open position connecting said source and said clutch means to engage the same and connecting said brake control valve and said brake means to disengage the same, said shift valve in its closed position interrupting the connection between the source and the clutch to disengage the same while activating the fluid pressure accumulator to maintain the brake disengaged until movement of said clutch control valve upon reverse rotational tendency of said reaction member.

8. A transmission having an input shaft, an output shaft, and gearing intermediate said shafts, said gearing having drive, driven and reaction members, said driving member being operatively connected to said input shaft, means connecting said driven member and said output shaft, clutch means for connecting said members for substantially unitary forward rotation, the application of torque to said driving member upon disengagement of said clutch means causing reverse rotation of said reaction member, brake means for preventing reverse rotation of said reaction member, means for applying said brake means including means controlled by reverse rotation of said reaction member for delaying the full engagement of said brake means until the forward rotation of said reaction member has terminated and the reverse rotation is initiated.

9. A transmission having a casing, an input shaft, an output shaft and gearing intermediate said shafts, said gearing having drive, driven and reaction members, means connecting said drive member and said input shaft, means connecting said driven member and said output shaft, hydraulically actuated brake means movable between engaged and disengaged positions for holding said reaction member stationary when engaged to provide a reduction drive through said gearing, means operatively connecting said brake means and said casing, and control means in said connection between said brake means and said casing responsive to the direction of rotation of said reaction member for controlling the hydraulic engagement of said brake means.

10. A shifting arrangement for changing the transmission ratio of a planetary change-speed transmission providing a plurality of transmission ratios and having a rotatable part adapted to reverse the direction of rotation thereof during the shifting operation, comprising selectively engageable means operatively associated with said one rotatable part for establishing at least one of said transmission ratios by preventing the rotation of said rotatable part in said reverse direction, control means for applying, upon actuation thereof, to said engageable means either substantially the full engagement pressure to effect complete engagement of said engageable means or only a partial pressure to effect only a relatively lesser engagement of said engageable means, actuating means for selectively actuating said control means, and reversal-responsive means operatively associated with said control means and operable in response to reversal of direction of rotation of said rotatable part to selectively control said control means, upon actuation by said actuating means, to initially apply to said engageable means only said partial pressure and to apply thereto said full engagement pressure upon reversal of the direction of rotation of said rotatable part.

References Cited by the Examiner
UNITED STATES PATENTS

| 2,370,859 | 3/1945 | Hale | 192—85 X |
| 2,645,137 | 7/1953 | Roche | 74—732 |
| 2,722,296 | 11/1955 | Stoeckicht | 192—.075 |
| 2,726,557 | 12/1955 | Ackerman | 74—732 |
| 2,766,639 | 10/1956 | Rosenberger | 74—472 |
| 2,770,148 | 11/1956 | Wayman | 74—472 |
| 2,792,716 | 5/1957 | Christenson | 74—732 |
| 3,022,676 | 2/1962 | Duffy | 74—472 |

DON A. WAITE, *Primary Examiner.*

BROUGHTON G. DURHAM, SAMUEL SPINTMAN,
*Examiners.*